United States Patent [19]

Hall et al.

[11] 4,253,534

[45] Mar. 3, 1981

[54] SPLASH-RESISTANT SCALE

[75] Inventors: Donivan L. Hall, Worthington, Ohio; Helmwart Fuelles, Cologne, Fed. Rep. of Germany

[73] Assignee: Reliance Electric Company, Cleveland, Ohio

[21] Appl. No.: 39,585

[22] Filed: May 17, 1979

[51] Int. Cl.³ .................... G01G 21/28; G01G 21/02
[52] U.S. Cl. ................................. 177/241; 177/179
[58] Field of Search ...................... 177/179, 241, 240

[56] References Cited

U.S. PATENT DOCUMENTS

| | | | |
|---|---|---|---|
| 3,194,332 | 7/1965 | Wiedemann | 177/241 |
| 4,008,776 | 2/1977 | Kushmuk | 177/241 X |
| 4,153,125 | 5/1979 | Hutchinson et al. | 177/241 X |

*Primary Examiner*—George H. Miller, Jr.
*Attorney, Agent, or Firm*—Pearne, Gordon, Sessions, McCoy & Granger

[57] ABSTRACT

A weight scale is made splash resistant from being splashed by liquids. Means is also disclosed for making the weight scale vapor resistant. The scale includes a housing on a column on a base and a force-to-electrical output transducer is mounted enclosed within the upper housing. A rod is enclosed within the column and is moved longitudinally therewithin by being connected to a lever system connected to the pan or platform on which the weight is received. The rod acts on the transducer and an electronic circuit provides an indication of the weight on an indicator also in the housing. Liquid splash-resistant means is positioned between the bottom of the base and the transducer within the housing for splash-resistant protection of this transducer. The foregoing abstract is merely a resume of one general application, is not a complete discussion of all principles of operation or applications, and is not to be construed as a limitation on the scope of the claimed subject matter.

21 Claims, 5 Drawing Figures

SPLASH-RESISTANT SCALE

BACKGROUND OF THE INVENTION

Weight scales have been constructed which include a base and an upstanding column thereon plus an indicator at the top of the column with this weight scale being all mechanical. A load receiver may be termed a platter, a platform, or a pan in different scales, and was movably mounted on the base to act through a lever system to pull on a stress rod. This rod was often called a steelyard, and mechanically acted on the indicator. In more recent years electronic scales have been utilized wherein the indicator was an electrical indicator and a force-to-electrical output transducer was mounted in the base to be acted on by the lever system which was connected to the load receiver. Electrical conductors then interconnected the transducer in the base and the indicator in the housing on top of the column.

Such electronic scales were useful in a protected environment where they were not subject to corrosive gasses or splashing liquids. However, many scales are used in an industrial environment, such as in food processing plants, wherein the plant is washed down with water spraying hoses perhaps once a day. Other industrial scales may be used in chemical plants such as fertilizer plants, with the area being washed down perhaps only once a year, nevertheless, splashing liquids can strike the scale at such time. The prior art has known of electronic scales which are resistant to such washdown situations. To accomplish this the prior art provided a transducer with a water tight compartment surrounding the transducer and with any covers sealed with a gasket. The electrical connection was through a water tight plug and cable connection, often potted in some hardened plastic to be water tight. Also, the transducer had to have some form of mechanical motion input from the lever system and this was often made water tight in some way, for example, by a flexible bellows at the point of force actuation. Such protective covering to make the transducer and its electrical connections and mechanical connections water tight added considerably to the complexity of the electronic scale and of course increased the cost of such splash-resistant scale.

There are thousands of mechanical scales still in use in the field with the base and lever system still in good working order. Such scales might be converted to electronic scales but then they would not be splash resistant.

The problem to be solved, accordingly, is how to provide a splash-resistant scale in a simpler and more economical manner without necessity for the water tight compartment for the transducer, the water tight but flexible connection to the force application point, and the water tight electrical connection to the transducer.

SUMMARY OF THE INVENTION

This problem is solved by a weight scale having an indicator at the top of the column on a base, a load receiver movably mounted on the base and acting on a pivoted lever, a force-to-electrical transducer connected to be mechanically streesed by a load on the load receiver, and electronic circuit means connecting the transducer to the indicator, the improvement comprising: said transducer being mounted at the top of the column and adjacent to the indicator, a stress member connected to said lever and connected to act on said transducer, and splash-resistant means between the bottom of said base and said transducer to inhibit liquids from wetting said transducer. In one embodiment both the indicator means and the transducer are mounted in the same housing.

The problem is also solved by a splash-resistant scale comprising, in combination, a base, a fulcrum on said base, a lever pivoted on said fulcrum, a load receiver mounted on said base and acting on said lever, an upstanding column secured to said base, housing means mounted on the upper portion of said column, a stress member such as a rod, for example, extending along or within said column and connected to said lever to be stressed by a load acting on said load receiver, a force-to-electrical transducer mounted in an enclosed manner in said housing means, means coacting between the upper portion of said stress rod and said transducer to actuate said transducer with stress on said stress rod, an indicator in said housing means, electronic circuit means connected to said transducer and indicator to receive an input signal from said transducer to provide on said indicator an indication of the weight of a load acting on said load receiver, and liquid splash-resistant means between the bottom of said base and said transducer and positioned in at least one of said base, column, and housing means for splash-resistant protection of said transducer.

The problem is further solved by a scale conversion apparatus for a scale having a base, a fulcrum on said base, a lever pivoted on said fulcrum, and a load receiver mounted on said base and acting on said lever, said scale conversion apparatus including: an upstanding column adapted to be secured to said base, housing means mounted on the upper portion of said column, a force-to-electrical transducer mounted in an enclosed manner in one of said column and said housing means, a stress member such as a rod, for example, extending generally along or within said column and adapted to be connected to the lever to be stressed by a load acting on the load receiver, means coacting between the upper portion of said stress rod and said transducer to actuate said transducer with stress on said stress rod, an indicator in said housing means, an electronic circuit connected to said transducer and indicator to receive an input signal from said transducer to provide on said indicator an indication of the weight of a load acting on the load receiver, and liquid splash-resistant means between the bottom of the base and said transducer and positioned in at least one of the base, said column, and said housing means for splash-resistant protection of said transducer.

An object of the invention is to provide a splash-resistant scale wherein a force-to-electrical output transducer need not be mounted within a water tight compartment with water tight electrical and force connections.

Another object of the invention is to provide an electronic scale which has splash-resistant means provided by a long spalsh path for liquid so the liquid will not reach the transducer.

Another object of the invention is to provide a conversion apparatus for scales already in the field so that such scales are converted to electronic scales which are splash and abuse resistant.

Other objects and a fuller understanding of the invention may be had by referring to the following description and claims, taken in conjunction with the accompanying drawing.

DETAILED DESCRIPTION

Figure 1:
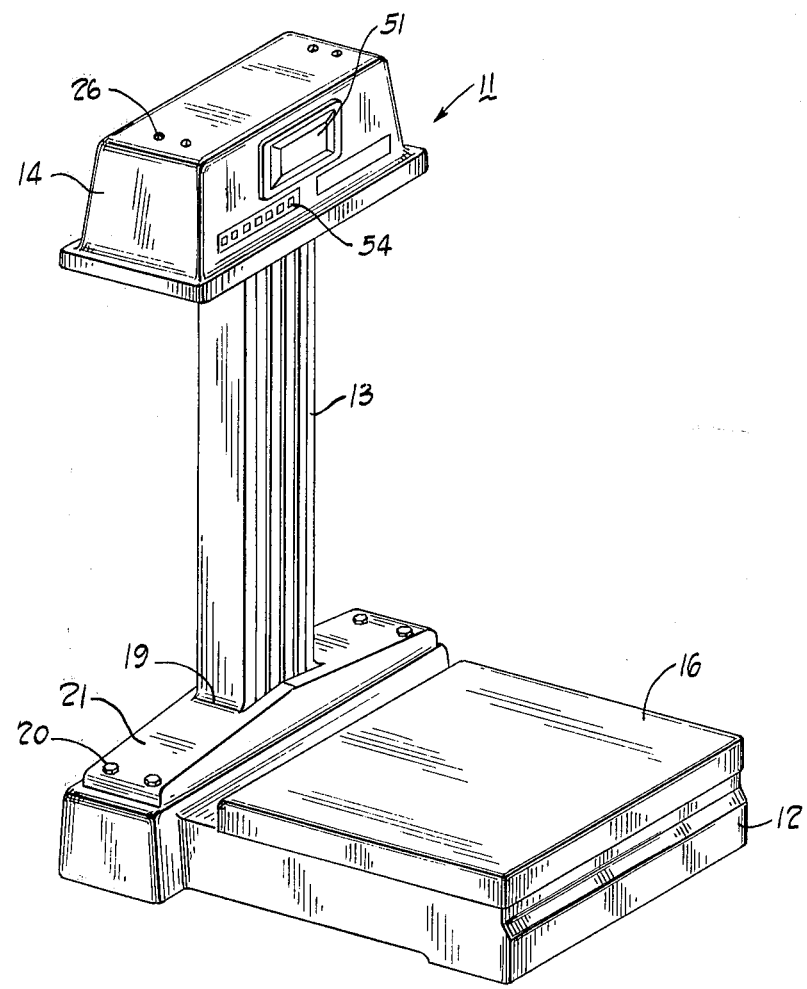
FIG. 1 is an isometric view of a scale embodying this invention.
Figures 2, 5:
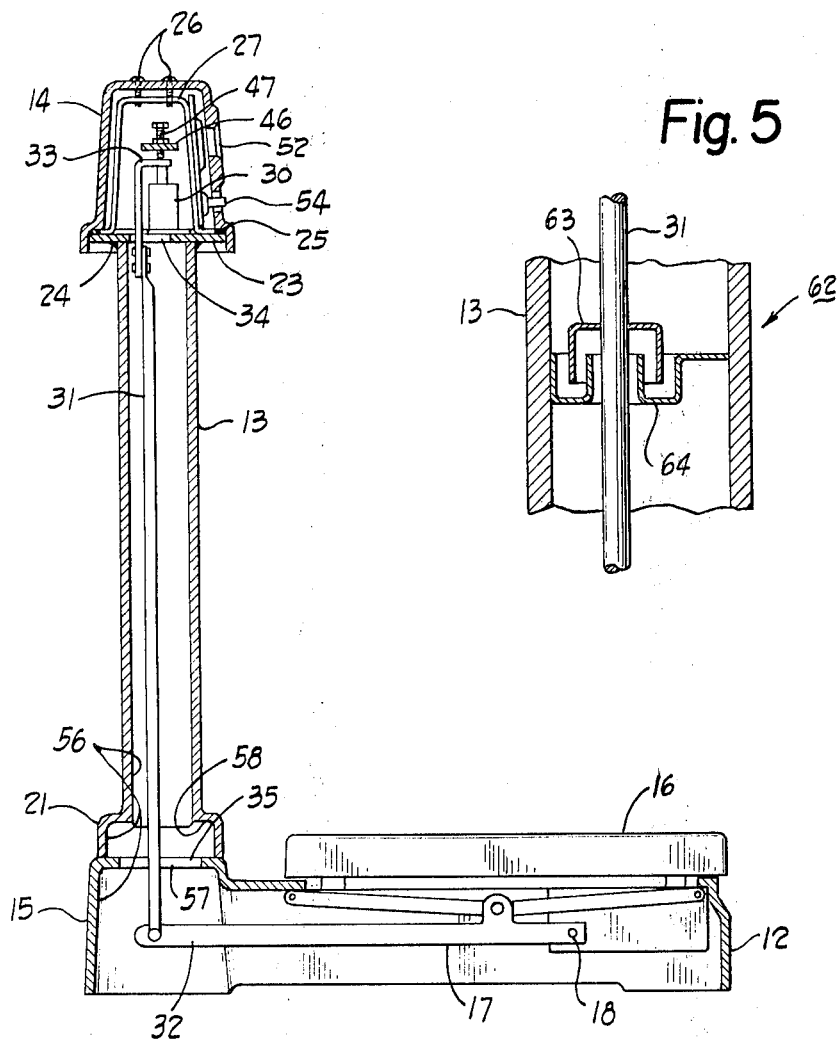
FIG. 2 is an elevational sectional view of the scale of FIG. 1.
FIG. 5 is an enlarged sectional view of a modification.

The figures of the drawing illustrate a splash and damage resistant scale 11 which includes generally a base 12, an upstanding column 13 on the base and a housing 14 at the upper portion of the column 13. The base has an open bottom as shown in FIG. 2 and includes side walls 15. This base is open at the top to receive a load receiver 16. This receiver may be called a platter or pan in some small bench scales or may be called a platform in larger floor scales. The load receiver 16 rests on and acts on a lever system 17. This lever system may take one of many forms well known in the prior art and is usually a force reducing and motion amplifying type of lever system. The lever system is pivoted on the base 12 at a pivot 18 which may be considered the fulcrum of the lever system.

The upstanding column 13 in this embodiment is hollow and extends generally vertically. The column is secured to the base in any convenient manner, and in this embodiment may be welded at 19 to a pedestal 21, which is then secured by bolts 20 to the base 12.

The housing 14 is secured to the upper portion of the column 13. To Achieve this, a base plate 23 is secured by welding, for example, at 24 to the top of this column 13. The housing 14 may be a one piece cup shaped housing inverted onto the base plate 23 and sealed thereto by a gasket 25 so as to form a water tight connection with the base plate. Cap screws 26 extend in a sealed manner through the top of the housing 14 and into inverted U-shaped brackets 27 to secure the housing 14 to the base plate 23.

A force-to-electrical output transducer 30 is mounted in one of the housing 14 and column 13. In this embodiment it is mounted inside the housing 14 on top of the base plate 23. A stress member, namely, a rod 31 extends along the column 13 and in this embodiment is enclosed within the hollow column 13. This stress rod coacts between the lever system 17 and the transducer 30. In many prior art scales a similar type of stress rod is called a steelyard. The lower end of the stress rod 31 is connected to a lever extension 32 of the lever system 17 with a pvotal interconnection. The upper end of the stress rod 31 is connected to an L-shaped end connection 33. This end connection 33 extends through an apertue 34 in the base plate 23. The stress rod 31 also extens through an aperture 35 in the upper portion of the base 12 to which the column 13 is connected.

Figure 3:
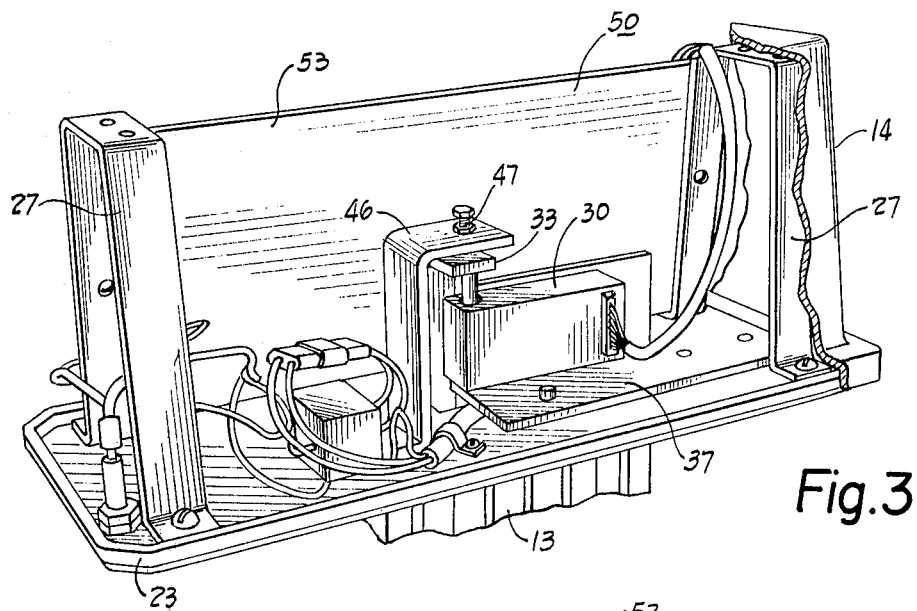
FIG. 3 is a perspective view of the upper portion of the scale with the housing removed.
Figure 4:
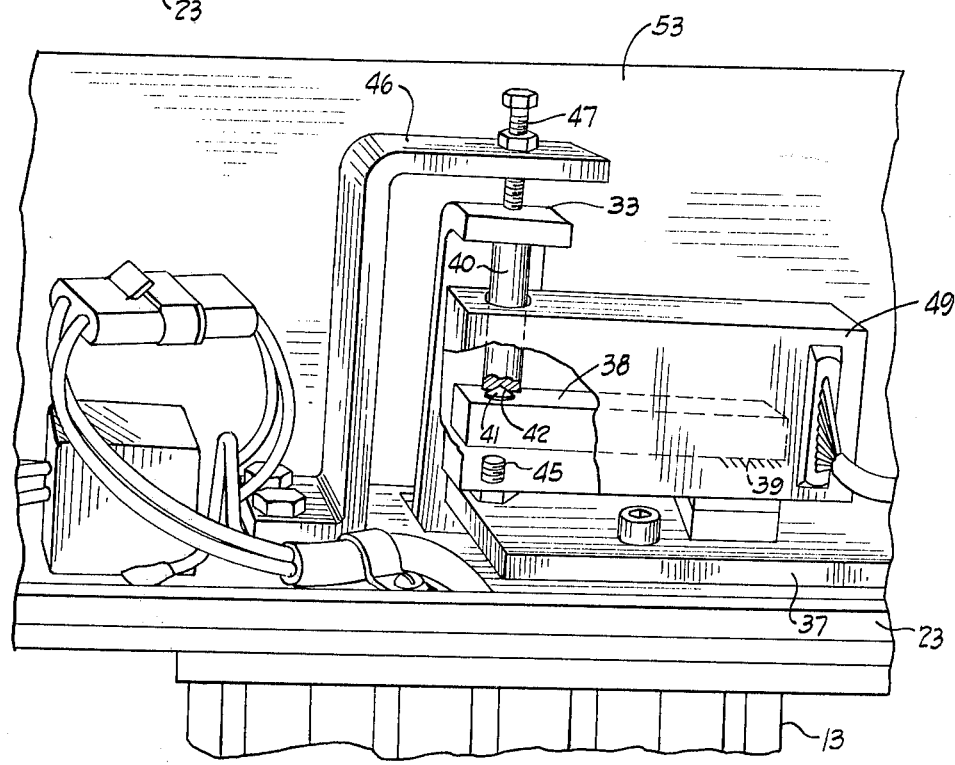
FIG. 4 is an enlarged perspective view of the scale upper portion.

The actual mounting of a typical transducer 30 is shown in more detail in FIGS. 3 and 4. A support plate 37 is secured on the bse plate 23 in a position which covers a part of the aperture 34 to make it not much larger than necessary to permit the L-shaped end connection 33 to extend through this aperture. The transducer 30 in this embodiment is a strain gauge type of load cell which is physically constructed as an elongated bar 38 which is cantilever mounted at 39 to the support plate 37. The distal end of this elongted bar extends to the left as viewed in FIG. 4 and is acted on downwardly by a pin 40 which is fixedly attached to end connection 33. The lower end of this pin has a conical socket or bearing 42 which is received by a conical pivot 41 mounted on the end of the transducer bar 38. Thus as the load receiver 16 is loaded with a weight, the stress rod 3 is pulled downwardly and the cantilever mounted elongated bar 38 is loaded downwardly.

In one commercially available type of strain gauge load cell, two pairs of electrical resistance wires are bonded onto the bar 38 with one pair being on the top to be stressed in tension and another pair being bonded on the bottom to be stressed in compression or relieved of tension, as the bar 38 is loaded downwardly. These two pairs of electrical resistance wires may be connected in a Wheatstone bridge arrangement for a sensitive strain gauge. Such strain gauge will have an electrical analog output proportional to the load placed on the load receiving platform 16.

An adjustable stop screw 45 may be locked in place in the support plate 37 and will bear against and support the underside of the load cell elongated bar 38 at some overload condtion. This might be 100% of scale capacity, for example. A Z-shaped rebound bracket 46 is secured to the base plate 23 and carries an adjustable rebound screw 47. This may be adjusted for a small clearance relative to the L-shaped end connection 33 with zero load on the load receiving platform 16 in order that any rebound movement of removal of load from the platform 16 will not cause the conical socket 42 to bounce off the pivot 41. The elongated bar 38 may be mounted inside a plastic case 49 for protection.

An electronic circuit means 50 is interconnected with the transducer 30 and an indicator 51. The indicator 51 in this embodiment is a digitl indicator which displays the digits, representing the weight on the load receiver 16, the display being behind a transparent panel 52. This panel is sealed liquid tight in the housing 14. Control switches 54 may be present in the housin 14, to control the electronic circuit means 50, for example, to set the tare for containers on the load receiver 16. These switches are sealed in the housing 14, in order to make all parts of the housing 14 down to the base plate 23 sealed liquid tight. The only opening is the aperture 34 in the base plate 23. The electronic circuit 50 may be one of several types and in this case with an analog output from the transducer 30, and analog to digital converter is provided, mounted on a printed circuit board 53 which stands vertically within the housing 14. In this case the weight on the platform 16 is then converted into a number of pulses and this governs the reading on the digital indicator 51.

Splash-resistant means 56 is provided within the scale 11 and is provided between the bottom of the base 12 and the transducer 30. This splash-resistant means is positioned in at least one of the base 12, column 13 and housing 14 for splash-resistant protection of the transducer. The splash-resistant means 56 includes baffles 57 and 58 and the baffle effect of the base plate 23 and support plate 37. The baffle 57 is positioned at the upper end of the base 12 and in actuality is the wall which forms the aperture 35 through which the stress rod 31 extends. This baffle 57 is a generally horizontal wall. The baffle 58 is another generally horizontal wall at the top of the pedestal 21 where it converges inwardly to be attached to the column 13. The base plate 23 acts as a baffle because the aperture 34 therein is smaller than the top of the column 13. This aperture 34 is still further narrowed by the support plate 37.

These baffles and the vertical height of the column 13 provide a tortuous path through the base, column and housing which are a part of the splash-resistant means 56. It will be observed from the figures that this tortuous splash path has a vertical length many times greater than the transverse dimension of the column. The splash-resistant scale 11 may be constructed as a bench scale adapted to be supported on a work height bench, in which case the column 13 might be in the order of 25 to 60 centimeters in height and in the order of 5 to 10 centimeters in transverse dimension. If the scale 11 is incorporated in a floor scale, then the column may be two or three times taller and not appreciably larger in transverse dimenstion.

Operation

When a load is placed on the load receiving platform 16, it acts through the lever system 17 to pull downwardly on the stress rod 31 and pull downwardly on the transducer 30. This transducer is cantilever mounted as shown in FIG. 4 and this produces an electrical analog signal. The electronic circuit 50 receives this analog signal, transforms it into a digital signal with the electronically processed result displayed on the digital indicator 51 as an indication of the weight on the load receiving platform 16.

In many locations, especially industrial plants, the scale 11 may be in an environment which is washed down once a day, or perhaps only once a year, but in any event the scale is subject to at least an occasional splashing with water. This wash-down procedure may be to wash contaminants from the area such as in a chemical or fertilizer processing plant wherein the chemical or the chemical as mixed with water may be corrosive. The splash-resistant scale 11 has been designed in an efficient and simple manner to be splash and abuse resistant. In many scales the load receiving platform 16 is removable and with the open bottom base 12, the entire base area may be hosed with water to clean the area underneath the scale 11. Due to the fact that the side wall 15 is laterally displaced from the aperture 35, this provides the baffle 57. Also the pedestal 21 is larger than the lower end of the column 13 and this provides the baffle 58. These baffles together with the baffle effect of the base plate 23 and support plate 37 provide a baffled path or tortuous splash path through which any liquid would have to traverse before it could reach the transducer 30. This splash path is vertically tall relative to its transverse dimension by contact with the inner wall of the base 12, and column 13 so as to inhibit contact with the transducer 30. It will be noted that the stress rod 31 does not touch any part of the base 12, column 13 or housing 14. This is important to avoid any interference with the accuracy of the scale 11. The absence of any bellows on the transducer 30, as is common with prior art scales mounting the transducer in the base, assures that there is no force required to deflect such bellows which could interfere with the accuracy of the scale 11.

The preferred embodiment of housing 14, column 13 and pedestal 21 provides a conversion apparatus which may be used to convert scales in the field. There are thousands of mechanical scales wherein the base and lever system are still in good working order for an accurate scale. The mechanical indicator on such scales may be removed from the base and the conversion apparatus of the present invention installed on such base by the bolts 20. The stress rod 31 merely needs to be connected to the lever extension 32 to provide a scale which has been converted to an electronic scale which is splash and abuse resistant. The fact that the transducer 30 is not mounted down in the base 12, as in some prior art scales, provides additional physical protection from abuse to this transducer. It was always possible that with the load receiver platform 16 removed, e.g. during cleaning procedures, something might be dropped on the transducer, if in the base, which could damage it.

FIG. 5 shows a modified form of splash resistant means 62 which may be mounted within the column 13. An inverted cup 63 is fixed on the stress rod 31 and extends downwardly into an annular upright cup 64. This cup is secured on the inside of the column 13. The cups 63 and 64 do not touch each other so as to not affect the accuracy of the scale 11. The internested cups 63 and 64 form a very effective labyrinth seal to prevent any water splashing up the column from reaching the transducer 30. The annular cup 64 may optionally be filled partially with oil to immerse the downturned rim of the cup 63. This will form a vapor barrier so that if steaming hot water, for example, is used to hose down the scale environment, then such steam or other vapors will not be permitted to reach the transducer 30.

The present disclosure includes that contained in the appended claims, as well as that of the foregoing description. Although this invention has been described with a certain degree of particularity, it is understood that the present disclosure of a specific form has been made only by way of example and that numerous changes in the details of construction and the combination and arrangement of parts may be resorted to without departing from the spirit and the scope of the invention as hereinafter claimed.

What is claimed is:

1. A splash-resistant scale comprising, in combination,
   a base,
   a fulcrum on said base,
   a lever pivoted on said fulcrum,
   a load receiver mounted on said base and acting on said lever,
   an upstanding column secured to said base,
   housing means mounted on the upper portion of said column,
   a stress member extending along said column and connected to said lever to be stressed by a load acting on said load receiver,
   a force-to-electrical transducer mounted in an enclosed manner in said housing means,
   means coacting between the upper portion of said stress member and said transducer to actuate said transducer with stress on said stress member,
   an indicator in said housing means,
   electronic circuit means connected to said transducer and indicator to receive an input signal from said transducer to provide on said indicator an indication of the weight of a load acting on said load receiver,
   and liquid splash-resistant means between the bottom of said base and said transducer.

2. A splash-resistant scale as set forth in claim 1, wherein said column is hollow, and said stress member is disposed within said column.

3. A splash-resistant scale as set forth in claim 1, wherein said scale is a platform scale having a generally horizontal platform as said load receiver.

4. A splash-resistant scale as set forth in claim 1, wherein said indicator is a digital indicator,
and said electronic circuit means includes a digital-to-analog converter connected to convert the analog output of said transducer into a digital signal.

5. A splash-resistant scale as set forth in claim 1, wherein said transducer is a strain gauge type load cell.

6. A splash-resistant scale as set forth in claim 1, wherein said splash-resistant means includes a tortuous splash-path.

7. A splash-resistant scale as set forth in claim 6, wherein the vertical length of said splash-path includes at least a portion of said column with said vertical length being many times greater than the transverse dimension of said column.

8. A splash-resistant scale as set forth in claim 1, wherein said splash-resistant means includes baffle means in one of said base, column and housing means.

9. A splash-resistant scale as set forth in claim 1, wherein said splash-resistant means includes a tortuous splash path through said base, column and housing means.

10. A splash-resistant scale as set forth in claim 2, wherein said splash-resistant means includes said column having a vertical height many times the transverse dimension of said column to inhibit any liquids splashing around said base from reaching said transducer.

11. In a weight scale having an indicator at the top of a column on a base, a load receiver movably mounted on the base and acting on a pivoted lever, a force-to-electrical transducer connected to be mechanically stressed by a load on the load receiver, and electronic circuit means connecting the transducer to the indicator,
the improvement comprising: said transducer being mounted at the top of said column and adjacent the indicator, a stress member connected to said lever and connected to act on said transducer, and splash-resistant means between the bottom of said base and said transducer to inhibit liquids from wetting said transducer.

12. A weight scale as set forth in claim 11, wherein said column is hollow and said stress rod is enclosed within said column.

13. A weight scale as set forth in claim 11, wherein said splash-resistant means includes internested cups acting between said stress member and said column.

14. A weight scale as set forth in claim 11, wherein said splash-resistant means includes the vertical height of the column being many times the maximum transverse dimension thereof to minimize the possibility of any liquids splashing on or around said base from reaching said transducer through said column.

15. A weight scale as set forth in claim 11, wherein said splash-resistant means includes the connection of said column to said base forming an effective splash-proof labyrinth seal inhibiting splashing liquids from reaching said transducer.

16. A weight scale as set forth in claim 11, including housing means at the top of said column containing said indicator, and means establishng the exterior of said housing means sealed liquid tight.

17. A weight scale as set forth in claim 16, including a liquid-tight seal between said column and said housing means.

18. A scale conversion apparatus for a scale having a base, a fulcrum on said base, a lever pivoted on said fulcrum, and a load receiver mounted on said base and acting on said lever, said scale conversion apparatus including:
an upstanding column adpated to be secured to said base,
housing means mounted on the upper portion of said column,
a force-to-electrical transducer mounted in an enclosed manner in one of said column and said housing means,
a stress member extending substantially parallel to said column and adapted to be connected to the lever to be stressed by a load acting on the load receiver,
means coacting between the upper portion of said stress member and said transducer to actuate said transducer with stress on said stress member,
an indicator in said housing means,
an electronic circuit connected to said transducer and indicator to receive an input signal from said transducer to provide on said indicator an indication of the weight of a load acting on the load receiver,
and liquid splash-resistant means between the bottom of the base and said transducer and positioned in at least one of the base, said column, and said housing means for splash-resistant protection of said transducer.

19. A conversion apparatus as set forth in claim 18, wherein said column is hollow,
and said stress rod is disposed within said column.

20. A conversion apparatus as set forth in claim 18, wherein said splash-resistant means includes a combination of a tortuous splash-path and a tall column.

21. A conversion apparatus as set forth in claim 20, wherein the vertical length of said splash-path includes at least a portion of said column with said vertical length being many times greater than the transverse dimension of said column.

* * * * *